(12) United States Patent
Kim et al.

(10) Patent No.: US 9,007,039 B2
(45) Date of Patent: Apr. 14, 2015

(54) SINGLE INDUCTOR MULTIPLE OUTPUT (SIMO) DIRECT CURRENT-TO-DIRECT CURRENT (DC/DC) CONVERTER AND CONTROL METHOD THEREOF

(75) Inventors: Chul Woo Kim, Seoul (KR); Jung Moon Kim, Gyeonggi-do (KR)

(73) Assignee: Korea University Research and Business Foundation, Seoul (KR)

( * ) Notice: Subject to any disclaimer, the term of this patent is extended or adjusted under 35 U.S.C. 154(b) by 326 days.

(21) Appl. No.: 13/495,382

(22) Filed: Jun. 13, 2012

(65) Prior Publication Data

US 2013/0147457 A1 Jun. 13, 2013

(30) Foreign Application Priority Data

Dec. 13, 2011 (KR) ........................ 10-2011-0133763

(51) Int. Cl.
| G05F 1/577 | (2006.01) |
| H02M 3/158 | (2006.01) |
| H02M 1/00 | (2006.01) |

(52) U.S. Cl.
CPC ........ H02M 3/158 (2013.01); *H02M 2001/009* (2013.01)

(58) Field of Classification Search
USPC ......... 323/222, 223, 225, 267, 271, 272, 283, 323/284, 285
See application file for complete search history.

(56) References Cited

U.S. PATENT DOCUMENTS

| 5,617,015 | A  | * | 4/1997 | Goder et al. ............... 323/282 |
| 7,592,791 | B2 | * | 9/2009 | Emira ..................... 323/283 |
| 7,714,560 | B2 | * | 5/2010 | Fukumori ............... 323/284 |
| 8,049,472 | B2 | * | 11/2011 | Easwaran et al. ............ 323/267 |
| 8,749,213 | B2 | * | 6/2014 | Chen .................... 323/267 |
| 2008/0231115 | A1 | * | 9/2008 | Cho et al. ................. 307/41 |
| 2010/0308654 | A1 | * | 12/2010 | Chen ..................... 307/31 |
| 2013/0082668 | A1 | * | 4/2013 | Tseng et al. ............... 323/267 |
| 2013/0229058 | A1 | * | 9/2013 | Chen ..................... 307/31 |

OTHER PUBLICATIONS

Japan Society of Applied Physics et al; "2011 Symposium on VLSI Circuits" Rihga Royal Hotel Kyoto, Kyoto, Japan Jun. 14-17, 2011 1 page.

(Continued)

*Primary Examiner* — Jue Zhang
*Assistant Examiner* — Lakaisha Jackson
(74) *Attorney, Agent, or Firm* — Ladas & Parry LLP (57) ABSTRACT

Provided is a single inductor multiple output (SIMO) direct current-to-direct current (DC/DC) converter that may perform DC/DC conversion by transferring, to output nodes, input current that is input and thereby stored in a single inductor. An output selection unit of the SIMO DC/DC converter may select, from output nodes, a first output node to be supplied with current from a driving unit, and provide output voltage of the first output node and reference voltage of the first output node to a hysteresis comparison unit. The hysteresis comparison unit may control on-time and/or inductor peak current by determining whether the output voltage of the first output node is higher than the reference voltage of the first output node by at least a first threshold, and whether the output voltage of the first output voltage is lower than the reference voltage of the first output voltage by at least a second threshold.

18 Claims, 10 Drawing Sheets

(56) References Cited

OTHER PUBLICATIONS

2011 VLSI Circuits Symposium Advance Program as of May 6, 2011; Symposium on VLSI Circuits 2011; Jun. 15-17, 2011; Rihga Royal Hotel Kyoto; Kyoto, Japan; Sponsored by The Japan Society of Applied Physics, and The IEEE Solid-State Circuits Society 22 pages.

Jungmoon Kim, et al; "A Single-Inductor 8-channel Output DC-DC Boost Converter with Time-limited One-shot Current Control and Single Shared.Hysteresis Comparator", 2011 Symposium on VLSI Circuits Digest of Technical Papers, Jun. 15-17, 2011; 2 pages.

Hanh-Phuc Le, et al; "A Single-Inductor Switching DC-DC Converter With Five Outputs and Ordered and Ordered Power-Distributive Control", IEEE Journal of Solid-State Circuits, vol. 42, No. 12, Dec. 2007, pp. 2706-2714.

Dongwon Kwon, et al; "Single-Inductor-Multiple-Output Switching DC-DC Converters", IEEE Transactions on Circuits and Systems-II: Express Briefs, vol. 56, No. 8, Aug. 2009, pp. 614-618.

Jungchul Gong, et al; "Single-Inductor Multiple-Output DC-DC Converter with negative feedback selection circuit", vol. 33, No. 1, Jun. 2010, at summer conference in a publication of the Insititute of Electronics Engineers of Korea (IEEK), pp. 533-536.

Dongsheng Ma, et al; "Single-Inductor Multiple-Output Switching Converters With Time-Multiplexing Control in Discontinuous Conduction Mode", IEEE Journal of Solid-State Circuits, vol. 38, No. 1, Jan. 2003, pp. 89-100.

KIPO Office Action dated Dec. 24, 2012.

* cited by examiner

SINGLE INDUCTOR MULTIPLE OUTPUT (SIMO) DIRECT CURRENT-TO-DIRECT CURRENT (DC/DC) CONVERTER AND CONTROL METHOD THEREOF

CROSS-REFERENCE TO RELATED APPLICATION

This application claims the priority benefit of Korean Patent Application No. 10-2011-0133763, filed on Dec. 13, 2011, in the Korean Intellectual Property Office, the disclosure of which is incorporated herein by reference.

BACKGROUND

1. Field of the Invention

The present invention relates to a direct current-to-direct current (DC/DC) converter, and more particularly, to a DC/DC converter that may supply current supplied through a single inductor through a plurality of output nodes, and a controlling method thereof.

2. Description of the Related Art

Current portable electronic devices may need both long battery lifespan and multi-functions. Due to the above need, a single inductor multiple output (SIMO) direct current-to-direct current (DC/DC) converter may be further popular in a power management system of a portable electronic device.

Unlike an existing converter structure that includes the same number of inductors as the number of outputs in order to generate multiple output voltage, a SIMO DC/DC converter may be configured to include only a single inductor that is supplied with current and thus, may have great advantages in aspects of a circuit area and cost.

Many portable electronic devices, for example, smart phones may be employed for a variety of applications such as a digital signal processing (DSP) operation, an audio and video play, a wireless communication, and the like. Each of the applications may use different magnitude or range of power supply. The SIMO DC/DC converter may be a solution that may satisfy such need.

In addition, when a graphical apparatus operates for video application, relatively great power may be consumed. Therefore, some apparatuses such as a communication apparatus may be in a sleep mode. In this case, power required for each output may continuously vary depending on a device operation. In response thereto, the SIMO DC/DC converter may be used.

As a conventional art that has embodied such SIMO DC/DC converter, disclosed is "Single-inductor multiple-output switching converters with time-multiplexing control in discontinuous conduction mode," prepared by D. Ma et al., on IEEE J. Solid-State Circuits, vol. 38, no. 1, pp. 89-100, in January of 2003.

In the conventional SIMO DC/DC converter, since the number of amplifiers increases in correspondence to the number of outputs and accordingly, compensation circuits need to be used, a circuit area and complexity may significantly increase according to an increase in the number of outputs.

In the conventional SIMO DC/DC converter, since amplifiers and compensation circuits are used, a circuit area and power consumption may increase. Accordingly, the efficiency may be degraded. In particular, a very considerable design may be required to guarantee the stability of circuit.

Accordingly, there is a desire for a highly efficient SIMO DC/DC converter that may cope with various power requirements in response to a request of output nodes and may also provide long battery lifespan while maintaining a circuit area and complexity to be small.

SUMMARY

An aspect of the present invention provides a single inductor multiple output (SIMO) direct current-to-direct current (DC/DC) converter that may guarantee stability without using an amplifier and a separate compensation circuit in order to use information about output nodes, that is load current, and a controlling method thereof.

Another aspect of the present invention also provides a SIMO DC/DC converter that may satisfy power requirements of output nodes without using an additional inductor, a compensation capacitor, a phase-locked loop (PLL), and the like, and a controlling method thereof.

According to an aspect of the present invention, there is provided a converter, including: an output selection unit to select, from a plurality of output nodes, a first output node to be supplied with current from a driving unit; a comparison unit to determine whether an output voltage of the first output node is higher than a reference voltage of the first output node by comparing the output voltage of the first output node with the reference voltage of the first output node; and a control unit to adjust a first time length to be a maximum time length in which the current is continuously supplied to the first output node based on the determination result.

The comparison unit may be a hysteresis comparison unit to determine whether the output voltage of the first output node is higher than the reference voltage of the first output node by at least a first threshold, and to determine whether the output voltage of the first output voltage is lower than the reference voltage of the first output voltage by at least a second threshold.

The comparison unit may include: a first RS flip-flop corresponding to the first output node; a first comparator to compare the output voltage of the first output node with a voltage higher than the reference voltage of the first output node by the first threshold; a second comparator to compare the output voltage of the first output node with a voltage lower than the reference voltage of the first output voltage by the second threshold; and at least one multiplexer to transfer an output value of the first comparator and an output value of the second comparator to the first RS flip-flop. The first RS flip-flop may store the output value of the first comparator and the output value of the second comparator.

The first RS flip-flop may transfer the output value of the first comparator and the output value of the second comparator to the control unit to count the number of current supplies that current is supplied by the control unit to the first output node until the output value of the first comparator becomes to be higher than the reference voltage of the first output node by the first threshold after the output voltage of the first output node is lower than the reference voltage of the first output node by at least the second threshold.

The control unit may include: a counter to count the number of current supplies that current is supplied by the control unit to the first output node until the output value of the first comparator becomes to be higher than the reference voltage of the first output node by the first threshold after the output voltage of the first output node is lower than the reference voltage of the first output node by at least the second threshold; a number of rising (NR) comparator to compare the counted number of current supplies with a predetermined maximum number of current supplies; and an on-time controller to increase the first time length when the counted number of current supplies exceeds the maximum number of current supplies.

When the first time length exceeds a first maximum time length set with respect to the first output node by increasing the first time length, the on-time controller may provide an instruction signal instructing to increase a peak value of input current that is input to the driving unit, without increasing the first time length. The control unit may further include an inductor peak current controller to control the peak value of input current to increase by transferring the instruction signal to the driving unit.

The NR comparator may compare the counted number of current supplies with a predetermined minimum number of current supplies. The on-time controller may be set to decrease the first time length when the counted number of current supplies is less than the minimum number of current supplies.

When the first time length becomes to be less than a first minimum time length set with respect to the first output node by decreasing the first time length, the on-time controller may provide an instruction signal instructing to decrease a peak value of input current that is input to the driving unit, without decreasing the first time length. The control unit may further include an inductor peak current controller to control the peak value of input current to decrease by transferring the instruction signal to the driving unit.

According to another aspect of the present invention, there is provided a SIMO DC/DC converter, including: a driving unit to store input current that is received from a single input node during a charging time duration and to transfer the stored input current to a plurality of output nodes during a discharging time duration; a lower switch controller to supply current to a first output node among the plurality of output nodes during a first time length corresponding to the first output node within the discharging time duration, wherein the current is transferred by the driving unit; and a comparison unit to compare an output voltage of the first output node with a reference voltage corresponding to the first output node.

The SIMO DC/DC converter may be a hysteresis comparison unit to determine whether the output voltage of the first output node is higher than the reference voltage of the first output node by at least a first threshold, and to determine whether the output voltage of the first output voltage is lower than the reference voltage of the first output voltage by at least a second threshold.

The controller may include: a counter to count the number of current supplies that current is supplied by the controller to the first output node until an output value of a first comparator becomes to be higher than the reference voltage of the first output node by a first threshold after the output voltage of the first output node is lower than the reference voltage of the first output node by at least a second threshold; an NR comparator to compare the counted number of current supplies with a predetermined maximum number of current supplies or a predetermined minimum number of current supplies; and an on-time controller to increase the first time length when the counted number of current supplies exceeds the maximum number of current supplies, and to decrease the first time length when the counted number of current supplies is less than the minimum number of current supplies.

When the first time length exceeds a first maximum time length set with respect to the first output node by increasing the first time length when the counted number of current supplies exceeds the maximum number of current supplies, the on-time controller may provide an instruction signal instructing to increase a peak value of input current that is input to the driving unit without increasing the first time length. The controller may further include an inductor peak current controller to control the peak value of input current to increase by transferring the instruction signal to the driving unit.

When the first time length becomes to be less than a first minimum time length set with respect to the first output node by decreasing the first time length when the counted number of current supplies is less than the minimum number of current supplies, the on-time controller may provide an instruction signal instructing to decrease a peak value of input current that is input to the driving unit without decreasing the first time length. The controller may further include an inductor peak current controller to control the peak value of input current to decrease by transferring the instruction signal to the driving unit.

According to still another aspect of the present invention, there is provided a method of controlling a converter, the method including: selecting, by an output selection unit from a plurality of output nodes, a first output node to be supplied with current from a driving unit to provide an output voltage of the first output node and a reference voltage of the first output node to a hysteresis comparison unit; determining, by the hysteresis comparison unit, whether the output voltage of the first output node is higher than the reference voltage of the first output node by at least a first threshold, and whether the output voltage of the first output voltage is lower than the reference voltage of the first output voltage by at least a second threshold; and counting, by a control unit, the number of current supplies that current is supplied by the control unit to the first output node until a output value of a first comparator becomes to be higher than the reference voltage of the first output node by the first threshold after the output voltage of the first output node is lower than the reference voltage of the first output node by at least the second threshold.

The method may further include: comparing, by the control unit, the number of current supplies with a predetermined maximum number of current supplies or a predetermined minimum number of current supplies; and increasing, by the control unit, the first time length when the counted number of current supplies exceeds the maximum number of current supplies, and decreasing the first time length when the counted number of current supplies is less than the minimum number of current supplies.

The method may further include providing, by the control unit, an instruction signal instructing to increase a peak value of input current that is input to the driving unit without increasing the first time length, and, when the first time length exceeds a first maximum time length set with respect to the first output node by increasing the first time length when the counted number of current supplies exceeds the maximum number of current supplies.

The method may further include providing, by the control unit, an instruction signal instructing to decrease a peak value of input current that is input to the driving unit without decreasing the first time length, when the first time length becomes to be less than a first minimum time length set with respect to the first output node by decreasing the first time length when the counted number of current supplies is less than the minimum number of current supplies.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
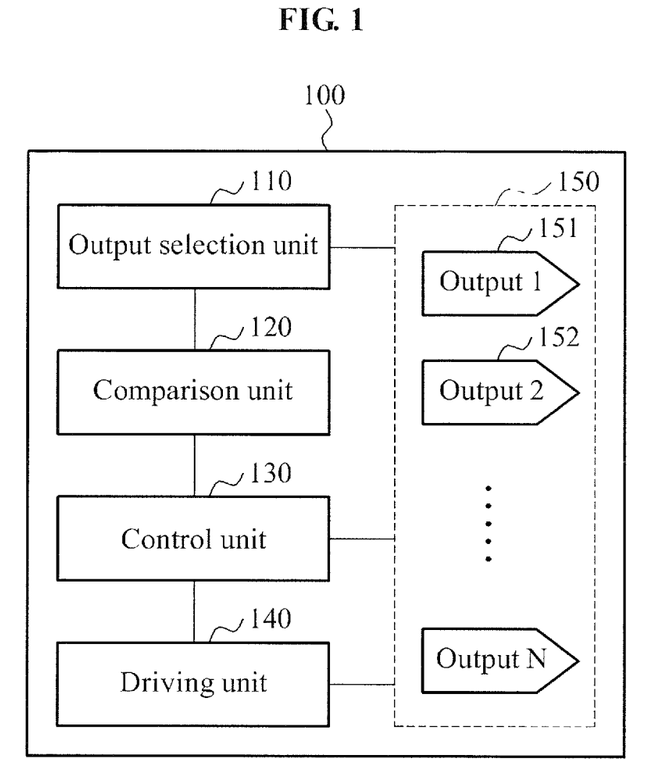
FIG. 1 is a block diagram illustrating a converter according to an embodiment of the present invention.

FIG. 1 is a block diagram illustrating a converter 100 according to an embodiment of the present invention.

The converter 100 according to an embodiment of the present invention may be a single inductor multiple output (SIMO) direct current-to-direct current (DC/DC) converter. The converter 100 may charge an energy storage device, for example, an inductor with input voltage or current that is input to a driving unit 140, and may supply the voltage or the current to output nodes 150 while charging the stored input voltage or current.

The output nodes 150 may provide different voltage levels for various applications. An output selection unit 110, a comparison unit 120, a control unit 130, and the driving unit 140 that are included in the converter 100 may maintain and manage a voltage level that is required by each of an output node (1) 151, an output node (2) 152, and the like, through the aforementioned process.

The output selection unit 110, the comparison unit 120, the control unit 130, and the driving unit 140 may monitor a voltage level of an $n^{th}$ first output node that is being supplied with voltage or current. Here, n denotes a natural number between 1 and N.

The output selection unit 110 may be configured by, for example, 1/N multiplexer (MUX). The output selection unit 110 may transfer a current output voltage $V_{out\_n}$ of a first output node to the comparison unit 120, and may also transfer, to the comparison unit 120, a reference voltage $V_{ref\_n}$ of the first output node that is determined based on specification.

The comparison unit 120 may be a hysteresis comparison unit.

In this case, the comparison unit 120 may determine whether the output voltage $V_{out\_n}$ of the first output node is greater than reference voltage $V_{ref\_n}$ of the first output node by at least a first threshold $V_{dh}$. When $V_{out\_n > Vref\_n} + V_{dh}$, the driving unit 140 may suspend supplying of current to the first output node according to control of the control unit 130.

Also, the comparison unit 120 may determine whether the output voltage $V_{out\_n}$ of the first output node is greater than the reference voltage $V_{ref\_n}$ of the first output node by at least a second threshold $V_{dl}$.

Depending on the determination result, the control unit 130 may increase or decrease a maximum time tos_n in which current is continuously supplied to the first output node at a time.

When an increase or a decrease in tos_n is beyond a predetermined minimum value tos_n min and a predetermined maximum value tos_n max, the control unit 130 may increase or decrease a peak value $I_{L\_peak}$ of inductor input current that is input to the driving unit 140.

A controlling method of a converter according to an embodiment of the present invention will be further described with reference to the accompanying drawings.

Figure 2:
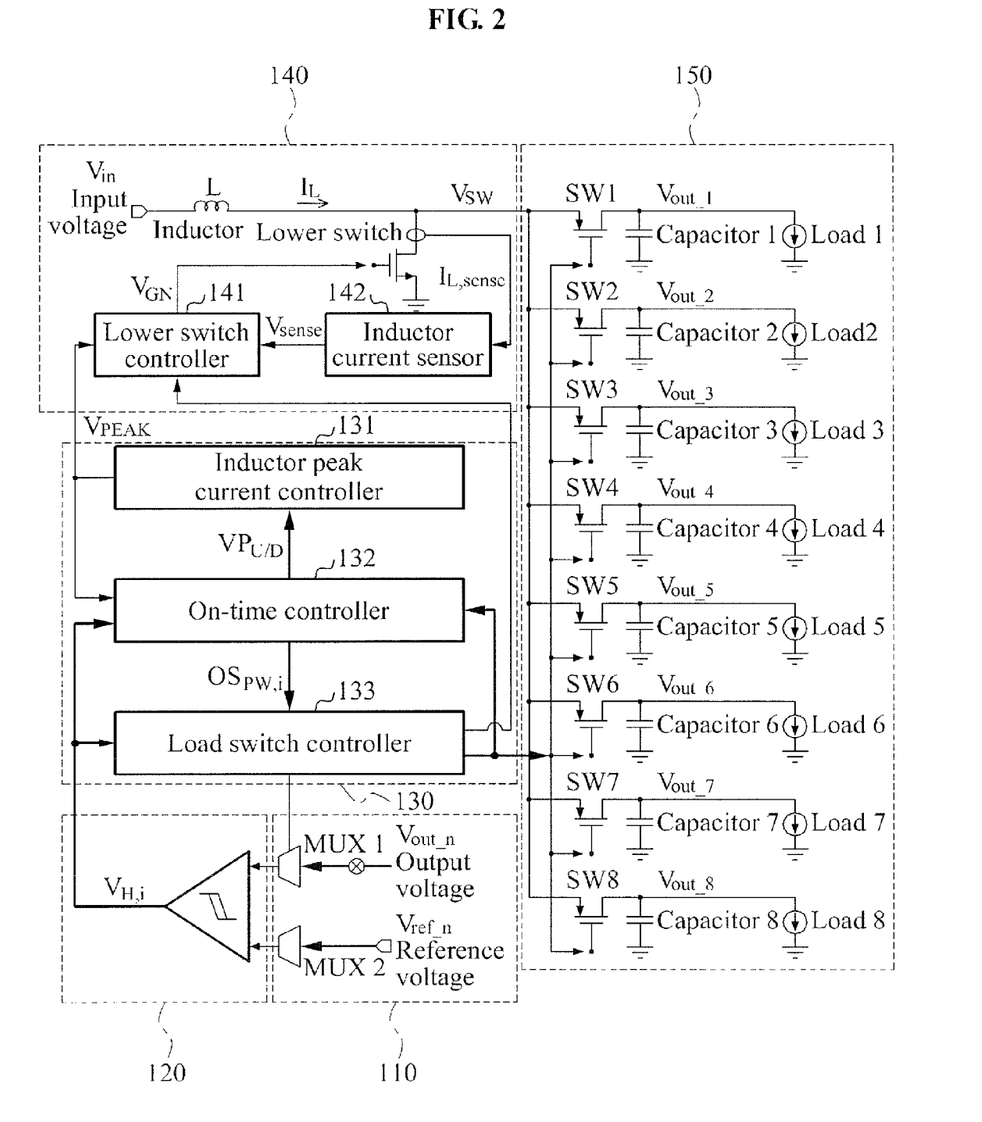
FIG. 2 is a circuit diagram illustrating an example of a single inductor multiple output (SIMO) direct current-to-direct current (DC/DC) converter according to an embodiment of the present invention.

FIG. 2 is a circuit diagram illustrating an example of a SIMO DC/DC converter 100 according to an embodiment of the present invention.

The SIMO DC/DC converter 100 may include only a single hysteresis comparison unit 120 in order to maintain all the output voltage levels to be around the respective desired reference voltage levels.

In the present exemplary embodiment, the number of comparators that is in proportion to the number N of output nodes may not be required. Output nodes 150 that are selected by an output selection unit 110 may share a single hysteresis comparison unit 120. Therefore, a circuit area for configuring the SIMO DC/DC converter 100 may decrease and power consumption may also decrease.

Compared to the conventional SIMO DC/DC converters, the comparison unit according to an exemplary embodiment of the present invention may have a relatively high stability. Since an amplifier is not included, the unconditional stability may be guaranteed without additionally including a separate compensation circuit, for example, compensation capacitors for compensating for instability of a circuit that may occur due to an internal feedback loop.

In the conventional SIMO DC/DC converters, a control unit may determine a peak value of inductor current by monitoring load current information through output of amplifiers. According to an embodiment of the present invention, a peak value $I_{L\_peak}$ of inductor current may be defined without using an amplifier and a compensation circuit, and an inductor peak current controller 131 may be used instead of using the amplifier and the like.

In an exemplary configuration of FIG. 2, other constituent elements excluding an inductor current sensor 142 or the hysteresis comparison unit 120 may be digitally designed and thus, the SIMO DC/DC converter 100 may be further robust against process, voltage, temperature (PVT) and stably operate at low power.

According to an embodiment of the present invention, a maximum current supply time tos_n in which each of the output nodes 150 is continuously supplied with current at a time may be set so that a portion of the output nodes 150 may not monopoly inductor current and all the output nodes 150 may be supplied with power. Here, tos_n may be set to be different for each of the output nodes 150, and may also be set to be the same for all the output nodes 150 depending on embodiments.

An operation of the configuration of FIG. 2 will be described in detail with reference to FIG. 3.

Figure 3:
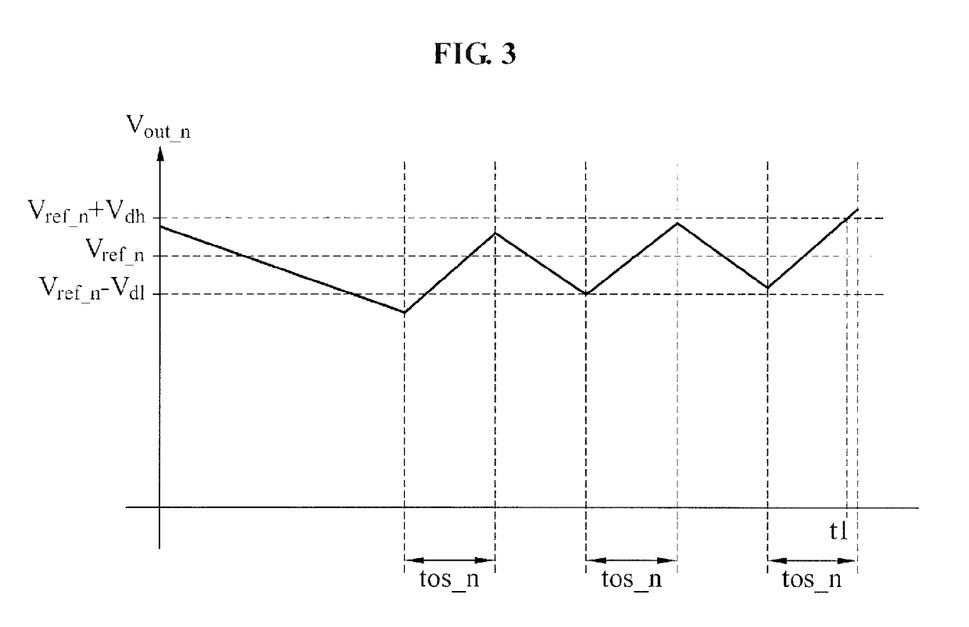
FIG. 3 is a graph to describe a process of supplying, by a converter, current to an $n^{th}$ output node according to an embodiment of the present invention.

FIG. 3 is a graph to describe a process of supplying, by a converter, current to an $n^{th}$ output node according to an embodiment of the present invention.

The graph shows output voltage $V_{out\_n}$ of the $n^{th}$ output node that is currently being supplied with current, while sequential current supply is being performed according to a predetermined schedule.

MUX1 of the output selection unit 1101 may transfer the output voltage $V_{out\_n}$ as a single input of the comparison unit 120, and MUX2 may transfer reference voltage $V_{ref\_n}$ of the corresponding $n^{th}$ output node as another input of the comparison unit 120. The comparison unit 120 may compare the output voltage $V_{out\_n}$ and the reference voltage $V_{ref\_n}$.

In this case, the comparison unit 120 may correspond to the hysteresis comparison unit, and may compare the output voltage $V_{out\_n}$ with each of $V_{ref\_n}+V_{dh}$ and $V_{ref\_n}-V_{dl}$.

At the moment when the output voltage $V_{out\_n}$ becomes to be less than $V_{ref\_n}-V_{dl}$ while supplying current to load without being supplied with current, tos_n may start and current may be supplied to the $n^{th}$ output node and the output voltage $V_{out\_n}$ may rise. Here, when tos_n is elapsed in a state where $V_{out\_n}$ has not reached $V_{ref\_n}+V_{dh}$, a lower switch controller 133 may switch current to be supplied to another output node. In this case, the output voltage $V_{out\_n}$ of the $n^{th}$ output node may fall again.

When subsequent tos_n starts, the above process may be repeated.

When $V_{out\_n}$ exceeds $V_{ref\_n}+V_{dl}$ at a time t1 the current supply may be suspended with respect to the corresponding output node depending on embodiments. Also, the current may be continuously supplied by a point in time when the corresponding tos_n is elapsed.

During the above process, the on-time controller 132 may count the number of current supplies that the current supply is repeated, and may increase tos_n or may increase inductor peak current $I_{L\_peak}$ through the inductor peak current controller 131 based on the counted number of current supplies.

Here, an increase or decrease in tos_n or the inductor peak current $I_{L\_peak}$ will be further described with reference to FIG. 4.

Figure 4:
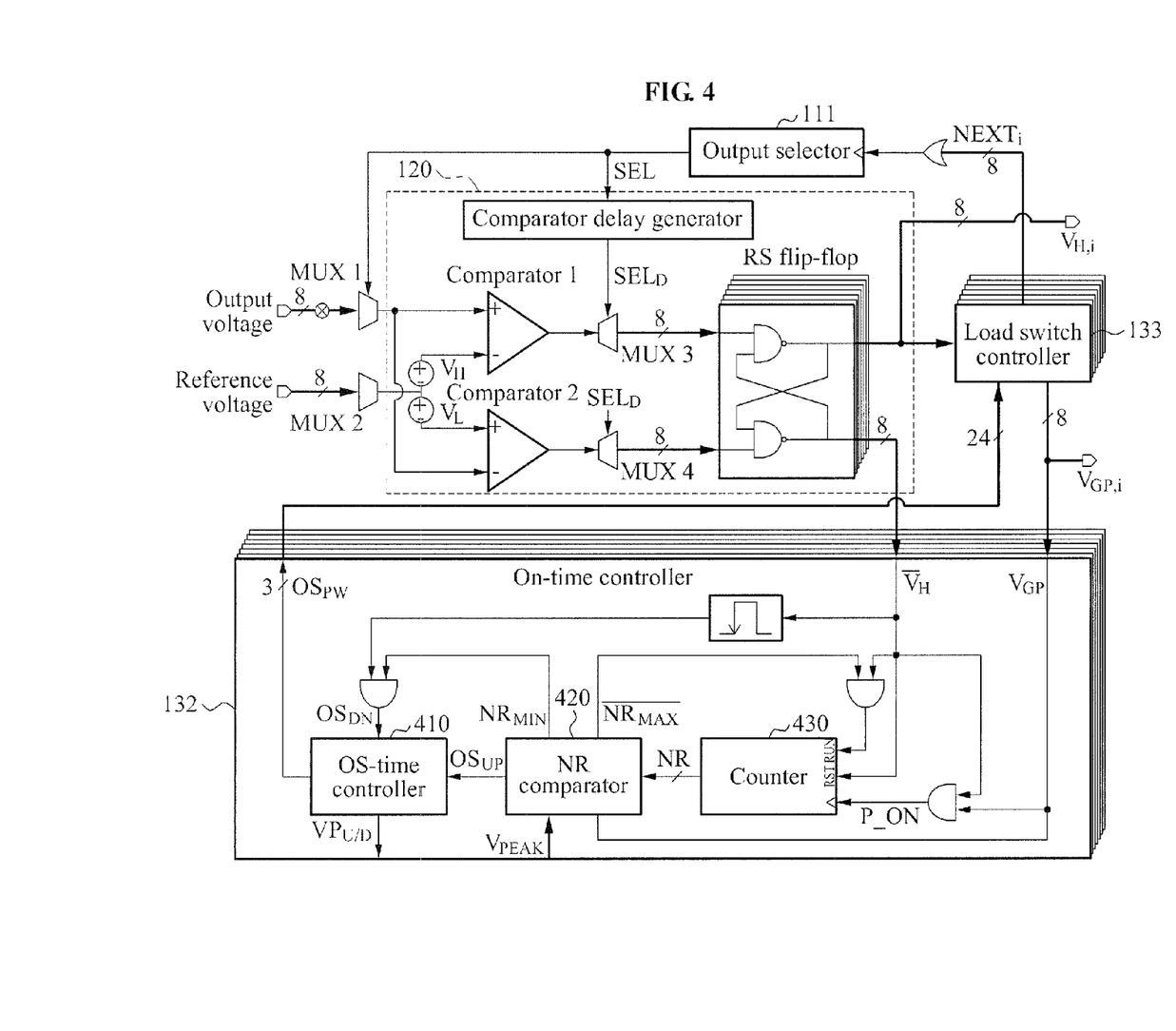
FIG. 4 is a circuit diagram illustrating an example of a comparison unit and an on-time controller according to an embodiment of the present invention.

FIG. 4 is a circuit diagram illustrating an example of the comparison unit 120 and the on-time controller 132 according to an embodiment of the present invention.

Among RS flip-flops included in the comparison unit 120, an RS flip-flop corresponding to an $n^{th}$ output node that is selected by an output selector 111 may store outputs of a first comparator (comparator 1) and a second comparator (comparator 2) and thereby generate $V_{H,n}$ and $V_{H,n\ bar}$.

Here, $V_{H,n}$ may be a digital value indicating whether the output voltage $V_{out\_n}$ of the $n^{th}$ output node has exceeded $V_{ref\_n}+V_{dh}$.

The number of times that $V_{out\_n}$ does not exceed $_{ref\_n}+V_{dh}$ and thus, tos_n is repeated may be counted by a counter 430. When $V_{out\_n}$ exceeds $_{ref\_n}+V_{dh}$, an NR comparator 420 may compare the counted number of current supplies with a predetermined maximum number of current supplies NR_max and/or minimum number of current supplies NR_min.

As the comparison result, when the number of current supplies exceeds NR_max, there is a need to increase supply of current to the corresponding output node. On the contrary, when the number of current supplies is less, than NR_min, there is a need to decrease the current supply. NR_max and NR_min may be set so that the number of current supplies may be an appropriate level, and may be set to be a value that may be changed depending on necessity. Also, NR_max and NR_min may be set to be different for each output node or may be set to be the same for all the output nodes.

When the number of current supplies exceeds NR_max, it may indicate that tos_n may be significantly repeated and thus, an OS-time controller 410 may increase tos_n. On the contrary, when the number of current supplies is less than NR_min, it may indicate that tos_n may be set to be unnecessarily large and thus, the OS-time controller 410 may decrease tos-n.

In the aforementioned embodiment, tos_n may be increased or decreased within a predetermined range.

According to an embodiment of the present invention, tos_n may be maintained to be between a predetermined maximum value tos_n max and minimum value tos_n min. Even though there is a need to increase or decrease tos_n, tos_n may need to be beyond the above range. In this case, the OS-time controller 410 may transfer, to the inductor peak current controller 131 to $VP_{u/d}$ signal indicating increase or decrease of the inductor peak current $I_{L\_peak}$.

The above controlling method will be further described later with reference to the accompanying drawings.

Figure 5:
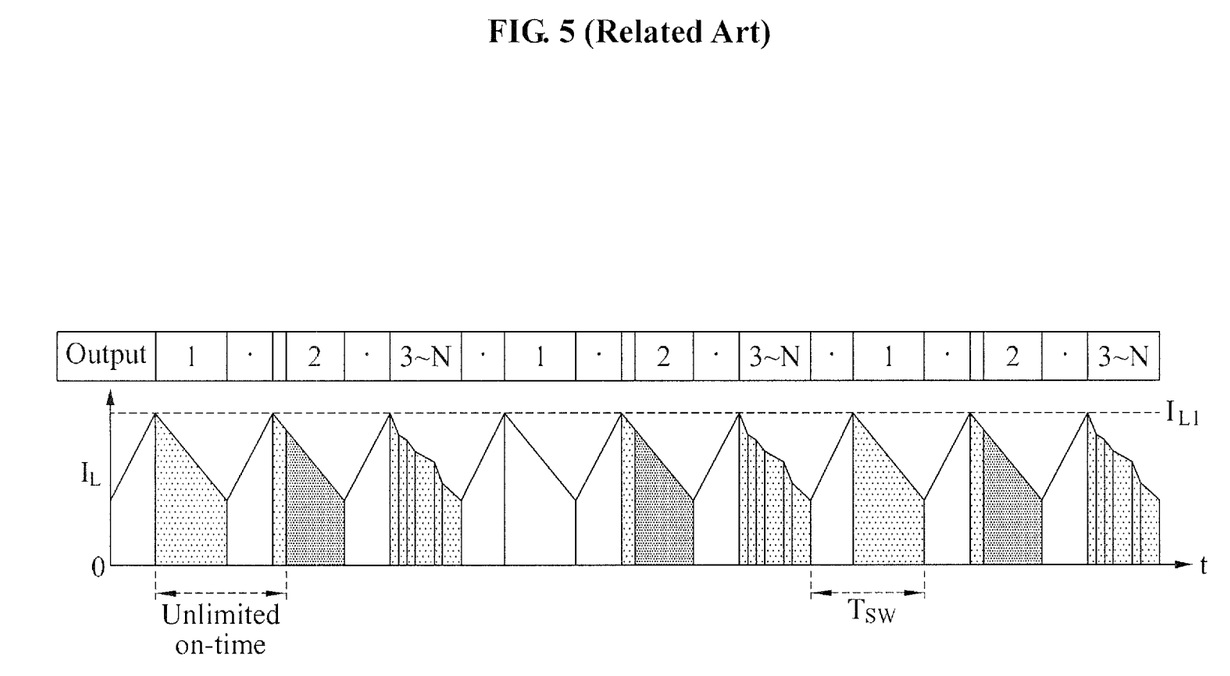
FIG. 5 and FIG. 6 are graphs for describing a method of controlling a converter according to an embodiment of the present invention.
Figure 6:
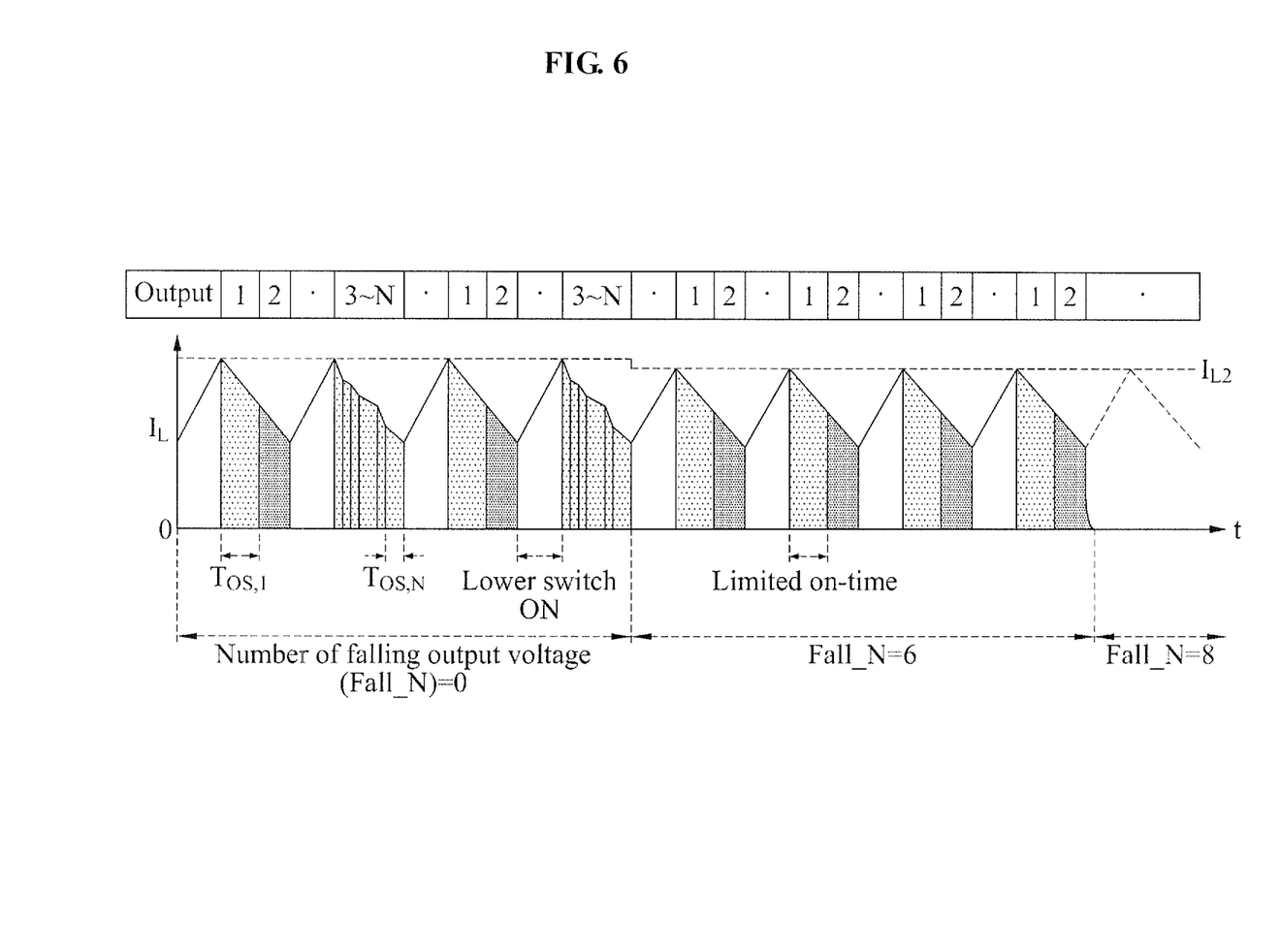

FIG. 5 and FIG. 6 are graphs for describing a method of controlling a converter according to an embodiment of the present invention.

In a conventional converter controlling method, tos_n may not be limited as shown in FIG. 5. Accordingly, when a predetermined output node among output nodes 1 through N requires a relatively great amount of current compared to other output nodes, inductor current may be unilaterally supplied to the output node during a relatively long period of time without being limited. In this case, other output nodes may fail to maintain a desired reference voltage level and thus, a stability issue may arise and the other output nodes may experience a power failure. Accordingly, the conventional controlling method may not guarantee the stability and may have a difficulty in increasing the number of outputs.

According to an embodiment of the present invention, as shown in FIG. 6, due to on-time tos_n in which a signal $OS_{PW\_n}$ generated by the on-time controller 132 appears, supply of inductor current to the $n^{th}$ output node may be temporally limited. Accordingly, other output nodes that need supply of inductor current may also be stably supplied with energy.

Here, supply of inductor current may be temporally limited and instead, a distribution amount of instantaneous inductor current, that is, inductor peak current $I_{L\_peak}$ may increase compared to an existing distribution method.

According to an embodiment of the present invention, voltage of each output node may relatively significantly experience ripple as shown in FIG. 3. Such issue may be solved by performing an add or a subtract operation with respect to the reference voltage $V_{ref\_n}$ and thereby decreasing magnitude of offset voltage $V_{dh}$ and $V_{dl}$ used by the comparison unit 120. A peak value of inductor current, offset voltage $V_{dh}$ and $V_{dl}$, and the like may be dynamically adjusted based on a current state of each load.

As shown in FIG. 6, when the number Fall_N of output voltage falling due to the limited hysteresis range is zero, it may indicate that all the output nodes need inductor current.

As described above, in this case, inductor peak current $I_{L2}$ may have a value greater than inductor peak current $I_{L1}$ of FIG. 5, and on-time may be limited to tos_n in order to prevent the stability from being degraded due to imbalanced load magnitude.

According to an embodiment of the present invention, due to an operational characteristic of a method of controlling the hysteresis comparison unit 120, output voltage that is sufficiently supplied with inductor current may start falling towards $V_{ref\_n}-V_{dl}$ and the corresponding output node may not require supply of the inductor current.

Referring to FIG. 6, when Fall_N becomes from "zero" to "6", supply of inductor current with respect to still rising two output voltage levels may be further easily performed. When Fall_N becomes "8", and when all the output nodes are being supplied with energy only from the respective capacitors instead of an inductor, the inductor current may become zero and thus, it is possible to minimize the waste of energy.

Accordingly, when supplying temporally limited inductor current, it is possible to easily increase the number of outputs of a SIMO DC/DC converter. Even though imbalance between load current is very significant, it is possible to guarantee high stability.

Figure 7:
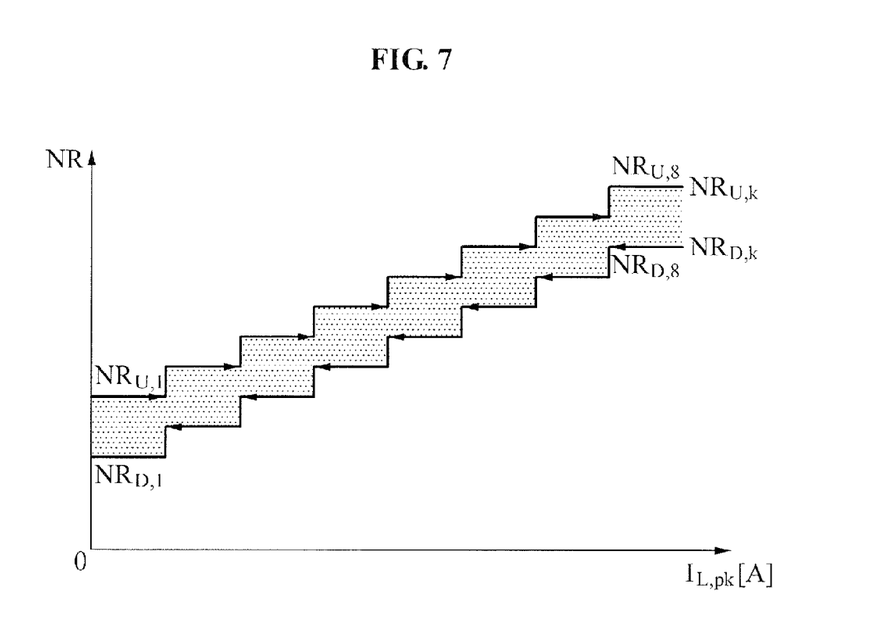
FIG. 7 is a graph to describe a process of counting the number of rising (NR) according to an embodiment of the present invention.

FIG. 7 is a graph to describe a process of counting NR according to an embodiment of the present invention.

The graph shows control of a load switch that is adjusted based on inductor peak current $I_{L\_peak}$ in the converter controlling method using the hysteresis comparison unit 120.

While output voltage is rising within the hysteresis range, the load switch may be continuously in an on-state. In the conventional methods, magnitude of load current may be known using an output value of an error amplifier. According to embodiments of the present invention, it is possible to know the magnitude of load current based on the number of times of ONs during rising of output voltage, that is, the number of current supplies that tos_n is repeated while $V_{out\_n}$ rising from $V_{ref\_n}-V_{dl}$ to $V_{ref\_n}+V_{dh}$.

The number of times of ONs, that is, NR during the above rising may be counted by the counter 430 that is included in the on-time controller 132 of FIG. 4.

The NR comparator 420 may manage NR within the range that is proportional to the inductor peak current $I_{L\_peak}$ as shown in the graph of FIG. 7.

When NR is outside the set range NR_min to NR_max, it may indicate that on-time with respect to a currently set load switch is large or small. Therefore, to increase or decrease on-time, an instruction instructing to decrease or increase on-time may be transferred to the OS-time controller 410 using a signal $OS_{DN}$ or $OS_{UP}$ that is generated by the on-time controller 132 of FIG. 4.

Figure 8:
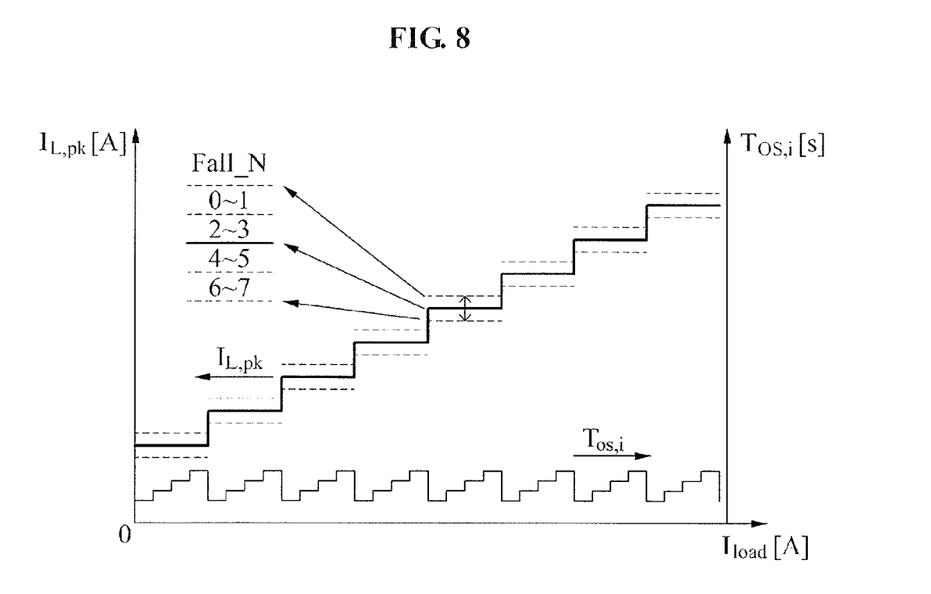
FIG. 8 is a graph to describe an on-time adjusting process according to an embodiment of the present invention.

FIG. 8 is a graph to describe an on-time adjusting process according to an embodiment of the present invention.

As shown in the graph of FIG. 8, when current is not sufficiently supplied to a load even using increased on-time, the on-time controller 132 may transfer, to the inductor peak current controller 131 using a signal $VP_{U/D}$, an instruction instructing to increase inductor peak current.

On the contrary, when decreased on-time cannot be further decreased, the on-time controller 132 may transfer, to the inductor peak controller 131, an instruction instructing to decrease inductor peak current.

According to an embodiment of the present invention, inductor peak current $I_{L\_peak}$ may be precisely controlled by on-time and by Fall_N, as shown in FIG. 8.

Figure 9:
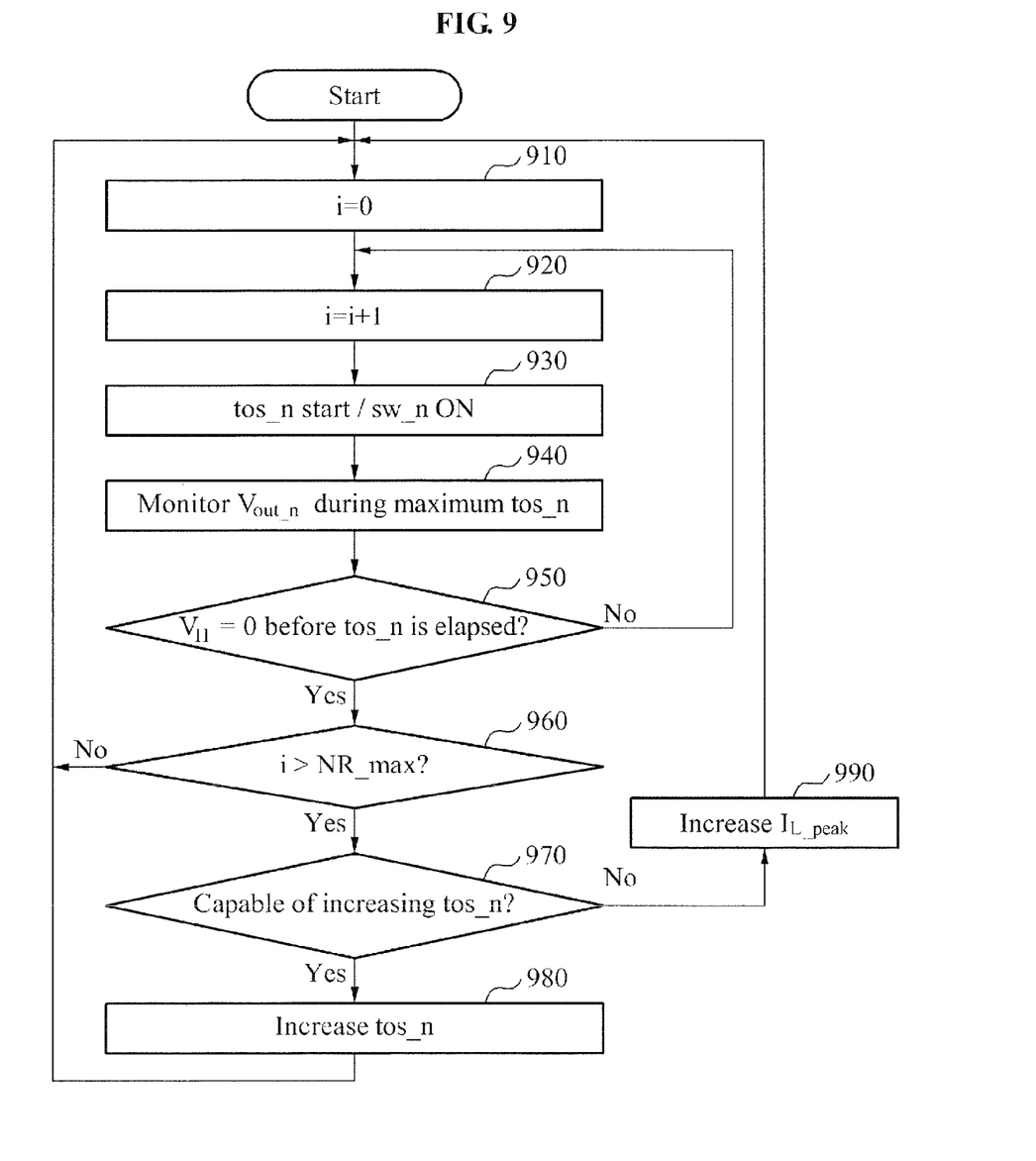
FIG. 9 and FIG. 10 are flowcharts illustrating a method of controlling a converter according to an embodiment of the present invention.
Figure 10:
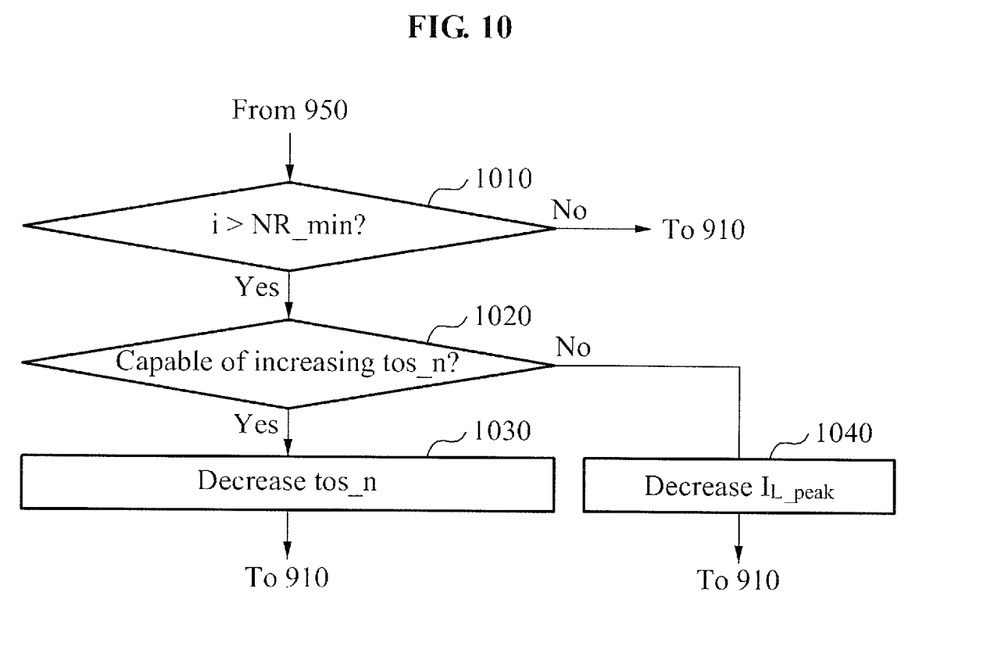

FIG. 9 and FIG. 10 are flowcharts illustrating a method of controlling a converter according to an embodiment of the present invention.

In operation 910, an initial value i that is counted NR may be set to zero. In operation 920, a value of i may increase by 1.

In operation 930, a current supply switch SW_n with respect to an $n^{th}$ output node among N output nodes may be ON, current supply may be initiated, and a one-time tos_n may be initiated.

In operation 940, the comparison unit 120 may monitor $V_{out\_n}$ during maximum tos_n.

In operation 950, the control unit 130 may determine whether the output voltage $V_{out\_n}$ of the $n^{th}$ output node has exceeded $V_{ref\_n}+V_{dh}$ before tos_n is elapsed, that is, whether the RS flip-flop output VH of FIG. 4 has become zero.

When tos_n is elapsed in a state where $V_{out\_n}$ has not exceeded $V_{ref\_n}+V_{dh}$ before tos_n is elapsed, current supply to another output node, for example, an $(n+1)^{th}$ output node may be initiated. When current supply is performed with respect to the $n^{th}$ output node again, a process after operation 920 may be repeated.

On the contrary, when $V_{out\_n}$ is determined to have exceeded $V_{ref\_n}+V_{dh}$ before tos_n is elapsed, counting of NR of the $n^{th}$ output node may be completed.

In this case, whether a current i value that is an NR count result is greater than NR_max that is a predetermined maximum number of current supplies may be determined in operation 960.

When i is greater than NR_max, it may indicate that the current supply is very frequently repeated and thus, the control unit 130 may supply current at a one time for a relatively long period of time by increasing tos_n, or may increase an amount of current supplied during the same period of time by increasing the inductor peak current $I_{L\_peak}$.

Here, as described above, it is possible to initially increase tos_n. In operation 970, whether a maximum value of tos_n, that is, tos_n max is exceeded by increasing tos_n may be determined.

When tos_n max is not exceeded, tos_n may be increased in operation 980. On the contrary, when tos_n max is exceeded, inductor peak current $I_{L\_peak}$ may be increased in operation 990 instead of increasing tos_n.

Even though a case where i is greater than NR_max is described in FIG. 9, a case where i is less than NR_min, that is, a case where current supply is determined to be unnecessarily frequently performed with respect to the $n^{th}$ output node may be processed as shown in FIG. 10.

In operation 1010, whether a current value of i of which counting of NR is completed in operation 950 is less than a predetermined minimum number of current supplies NR_min may be determined. When i is less than NR_min, it may indicate that current supply is unnecessarily frequently performed with respect to the $n^{th}$ output node. Therefore, the control unit 130 may determine whether to decrease tos_n in operation 1020.

Specifically, in operation 1020, whether the decreased tos_n becomes to be less than tos_n by decreasing tos_n min may be determined. When tos_n becomes to be less than tos_n min by decreasing tos_n, the inductor peak current $I_{L\_peak}$ may be decreased in operation 1040 instead of decreasing tos_n.

On the contrary, when tos_n can be further decreased, a process after operation 910 may be repeated after decreasing tos_n in operation 1030.

The above converter controlling process may refer to the description made above with reference to FIGS. 1 through 8.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to embodiments of the present invention, a separate amplifier or compensation circuit may not be used to configure a SIMO DC/DC converter. Therefore, while providing a large number of outputs, it is possible to maintain a circuit area or complexity and power consumption to be low, and to guarantee a high stability.

According to embodiments of the present invention, even though there is a significant difference in amounts of power required by loads that are supplied with power through the respective output nodes, it is possible to further stably supply power compared to an existing structure, and to be operable in a continuous conduction mode (CCM).

In addition, the SIMO DC/DC converter according to the present invention may have small constraints compared to the existing structure and thus, be advantageous in an expandability aspect.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A converter, comprising:
an output selection unit to select, from a plurality of output nodes, a first output node to be supplied with current from a driving unit;
a comparison unit to determine whether an output voltage of the first output node is higher than a reference voltage of the first output node by comparing the output voltage of the first output node with the reference voltage of the first output node; and
a control unit to adjust a first time length to be a maximum time length in which the current is continuously supplied to the first output node based on the determination result, wherein the control unit comprises:
an on-time controller to increase the first time length when a counted number of current supplies exceeds a maximum number of current supplies; and
an inductor peak current controller to control a peak value of input current.

2. The converter of claim 1, wherein the comparison unit is a hysteresis comparison unit to determine whether the output voltage of the first output node is higher than the reference voltage of the first output node by at least a first threshold, and to determine whether the output voltage of the first output voltage is lower than the reference voltage of the first output voltage by at least a second threshold.

3. The converter of claim 2, wherein the comparison unit comprises:
a first RS flip-flop corresponding to the first output node;
a first comparator to compare the output voltage of the first output node with a voltage higher than the reference voltage of the first output node by the first threshold;
a second comparator to compare the output voltage of the first output node with a voltage lower than the reference voltage of the first output voltage by the second threshold; and
at least one multiplexer to transfer an output value of the first comparator and an output value of the second comparator to the first RS flip-flop, and
the first RS flip-flop stores the output value of the first comparator and the output value of the second comparator.

4. The converter of claim 3, wherein the first RS flip-flop transfers the output value of the first comparator and the output value of the second comparator to the control unit to count the number of current supplies to which current is supplied by the control unit to the first output node until the output value of the first comparator becomes to be higher than the reference voltage of the first output node by the first threshold after the output voltage of the first output node is lower than the reference voltage of the first output node by at least the second threshold.

5. The converter of claim 3, wherein the control unit comprises:
a counter to count the number of current supplies to which current is supplied by the control unit to the first output node until the output value of the first comparator becomes to be higher than the reference voltage of the first output node by the first threshold after the output voltage of the first output node is lower than the reference voltage of the first output node by at least the second threshold; and
a number of rising (NR) comparator to compare the counted number of current supplies with a predetermined maximum number of current supplies.

6. The converter of claim 5, wherein:
when the first time length exceeds a first maximum time length set with respect to the first output node by increasing the first time length, the on-time controller provides an instruction signal instructing to increase a peak value of input current that is input to the driving unit, without increasing the first time length,
wherein the inductor peak current controller controls the peak value of input current to increase by transferring the instruction signal to the driving unit.

7. The converter of claim 5, wherein:
the NR comparator compares the counted number of current supplies with a predetermined minimum number of current supplies, and
the on-time controller is set to decrease the first time length when the counted number of current supplies is less than the minimum number of current supplies.

8. The converter of claim 7, wherein:
when the first time length becomes to be less than a first minimum time length set with respect to the first output node by decreasing the first time length, the on-time controller provides an instruction signal instructing to decrease a peak value of input current that is input to the driving unit, without decreasing the first time length, and
wherein the inductor peak current controller controls the peak value of input current to decrease by transferring the instruction signal to the driving unit.

9. A single inductor multiple output (SIMO) direct current-to-direct current (DC/DC) converter, comprising:
a driving unit to store input current that is received from a single input node during a charging time duration and to transfer the stored input current to a plurality of output nodes during a discharging time duration;
a load switch controller to supply current to a first output node among the plurality of output nodes during a first time length corresponding to the first output node within the discharging time duration, wherein the current is transferred by the driving unit;

a comparison unit to compare an output voltage of the first output node with a reference voltage corresponding to the first output node;

an on-time controller to increase the first time length when a counted number of current supplies exceeds a maximum number of current supplies; and an inductor peak current controller to control the peak value of input current.

10. The SIMO DC/DC converter of claim 9, wherein the SIMO DC/DC converter is a hysteresis comparison unit to determine whether the output voltage of the first output node is higher than the reference voltage of the first output node by at least a first threshold, and to determine whether the output voltage of the first output voltage is lower than the reference voltage of the first output voltage by at least a second threshold.

11. The SIMO DC/DC converter of claim 9, wherein the controller comprises:

a counter to count the number of current supplies to which current is supplied by the controller to the first output node until an output value of a first comparator becomes to be higher than the reference voltage of the first output node by a first threshold after the output voltage of the first output node is lower than the reference voltage of the first output node by at least a second threshold;

a number of rising (NR) comparator to compare the counted number of current supplies with a predetermined maximum number of current supplies or a predetermined minimum number of current supplies; and the on-time controller decreases the first time length when the counted number of current supplies is less than the minimum number of current supplies.

12. The SIMO DC/DC converter of claim 11, wherein when the first time length exceeds a first maximum time length set with respect to the first output node by increasing the first time length when the counted number of current supplies exceeds the maximum number of current supplies, the on-time controller provides an instruction signal instructing to increase a peak value of input current that is input to the driving unit without increasing the first time length, the inductor peak current controller controls the peak value of input current to increase by transferring the instruction signal to the driving unit.

13. The SIMO DC/DC converter of claim 11, wherein when the first time length becomes to be less than a first minimum time length set with respect to the first output node by decreasing the first time length when the counted number of current supplies is less than the minimum number of current supplies, the on-time controller provides an instruction signal instructing to decrease a peak value of input current that is input to the driving unit without decreasing the first time length, and the inductor peak current controller controls the peak value of input current to decrease by transferring the instruction signal to the driving unit.

14. A method of controlling a converter, the method comprising:

selecting, by an output selection unit from a plurality of output nodes, a first output node to be supplied with current from a driving unit to provide an output voltage of the first output node and a reference voltage of the first output node to a hysteresis comparison unit;

determining, by the hysteresis comparison unit, whether the output voltage of the first output node is higher than the reference voltage of the first output node by at least a first threshold, and whether the output voltage of the first output voltage is lower than the reference voltage of the first output voltage by at least a second threshold;

counting, by a control unit, the number of current supplies to which current is supplied by the control unit to the first output node until a output value of a first comparator becomes to be higher than the reference voltage of the first output node by the first threshold after the output voltage of the first output node is lower than the reference voltage of the first output node by at least the second threshold;

adjusting, by the control unit the first time length in accordance with the counted number of current supplies; and providing, by the control unit, an instruction signal instructing to modify a peak value of input current that is input to the driving unit without modifying the first time length.

15. The method of claim 14, further comprising:

comparing, by the control unit, the number of current supplies with a predetermined maximum number of current supplies or a predetermined minimum number of current supplies; and increasing, by the control unit, the first time length when the counted number of current supplies exceeds the maximum number of current supplies, and decreasing the first time length when the counted number of current supplies is less than the minimum number of current supplies.

16. The method of claim 15, further comprising:

providing, by the control unit, an instruction signal instructing to increase a peak value of input current that is input to the driving unit without increasing the first time length, and, when the first time length exceeds a first maximum time length set with respect to the first output node by increasing the first time length when the counted number of current supplies exceeds the maximum number of current supplies.

17. The method of claim 15, further comprising:

providing, by the control unit, an instruction signal instructing to decrease a peak value of input current that is input to the driving unit without decreasing the first time length, when the first time length becomes to be less than a first minimum time length set with respect to the first output node by decreasing the first time length when the counted number of current supplies is less than the minimum number of current supplies.

18. A non-transitory computer-readable recording medium storing a program to implement the method of claim 14.

* * * * *